Patented Feb. 13, 1945

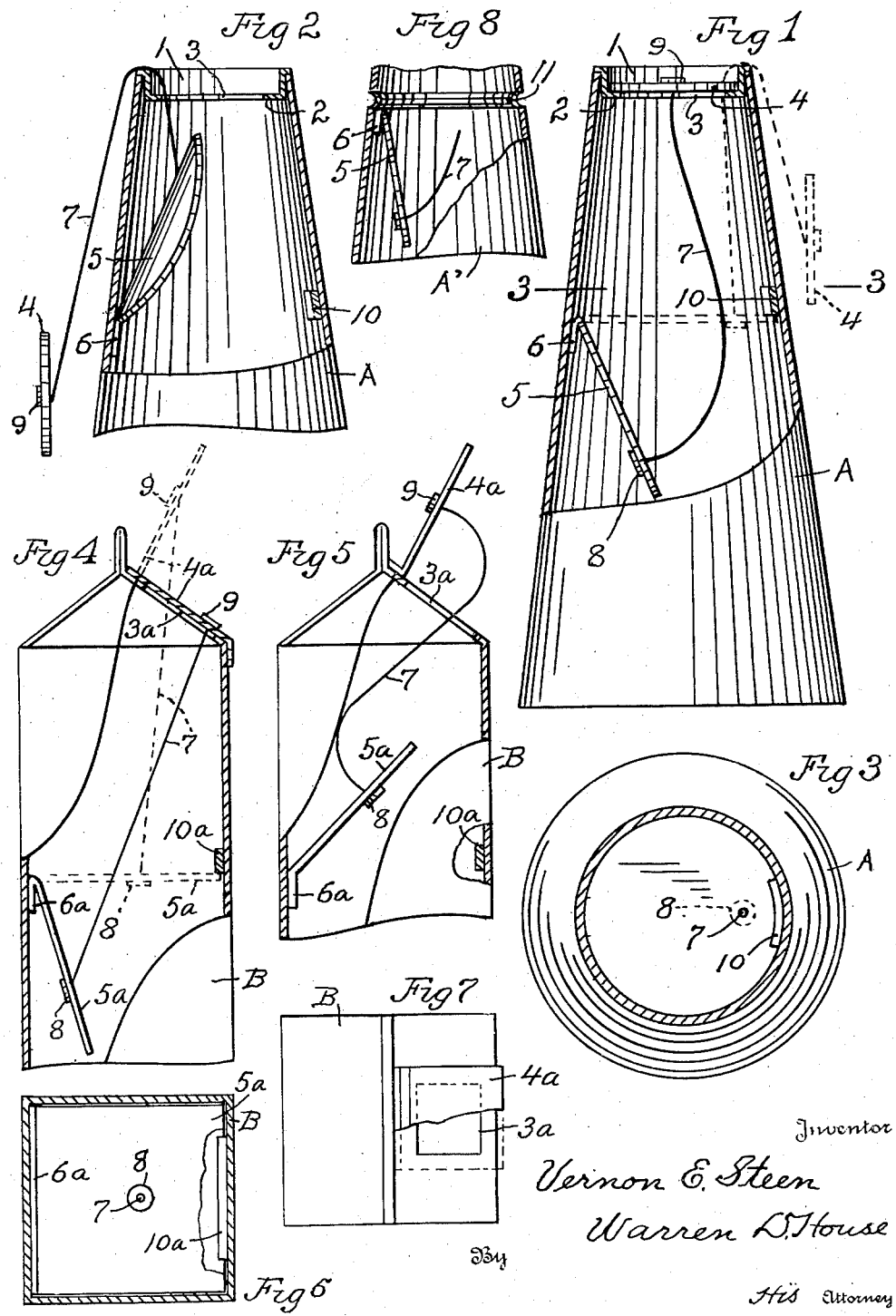

2,369,322

UNITED STATES PATENT OFFICE 2,369,322

CREAM SEPARATING DEVICE FOR MILK CONTAINERS

Vernon E. Steen, Kansas City, Mo.

Application June 19, 1944, Serial No. 540,950

5 Claims. (Cl. 210—51.5)

My invention relates to improvements in cream separating devices for milk containers.

It relates particularly to cream separating devices adapted for use in milk containers of the kind usually made in paper cartons, having different forms, as conoidal, circular or rectangular.

Such milk containers are provided each with a milk discharge opening at its upper end, such opening being adapted for being closed by different types of closures, as wholly detachable paper disks, or hinged closures adapted to be held closed by glue.

One of the objects of my invention is the provision of a novel cream separating valve fitted in the container with which it is to be used and hinged to an inner wall thereof below and spaced a substantial distance below the discharge opening, so as to be adapted to be swung from a depending open position, to permit the cream to rise, to a transverse closed position and then upwardly to an open position, to permit pouring out of the milk after the cream has been poured out.

Another object of my invention is the provision of novel means for so swinging the valve.

Still another object of my invention is the provision of a novel cream separating device, which is simple, strong, durable, which is easily and cheaply adaptable to the container with which it is to be used, which is easily operated by an unskilled person, and which is efficient in its operation.

The novel features of my invention are hereinafter fully described and claimed.

In the accompanying drawing, which illustrates different adaptations of my invention to different kinds of milk containers.

Fig. 1 is a side view, partly in elevation and partly in vertical section of a conoidal type of milk container provided with one form of my invention in which an operating strand connects the valve with the closure of a detachable type.

Fig. 2 is a view similar to that in Fig. 1, showing the upper portion of the conoidal container, with the valve in the upwardly extending open position.

Fig. 3 is a section on the plane of the line 3—3 of Fig. 1, showing the valve in the transverse closed position.

Fig. 4 is a side view, partly in elevation and partly in vertical section, of the upper portion of a milk container of the rectangular type provided with one form of my invention in which a strand connects the valve with a hinged closure adapted to be glued in its closed position, as shown in solid lines, the valve being shown in the transverse closed position in dotted lines and the closure swung to the open position.

Fig. 5 is a view similar to that shown in Fig. 4, with the valve and closure shown in the upwardly extending open positions.

Fig. 6 is a horizontal cross section of the container shown in Fig. 4, showing the valve in the transverse closed position and partly broken away to show the abutment strip, looking upwardly from below the valve.

Fig. 7 is a top view of the container shown in Figs. 4, 5 and 6, part of the closure being broken away to show the discharge opening.

Fig. 8 is another form of my invention in which the abutment means comprises an inwardly extending peripheral crease in the wall of a conoidal form of container, a portion of which is shown in vertical section, and the valve shown in the depending open position, a portion of the strand attached to the valve being shown.

Similar characters of reference designate similar parts in the different views.

Referring to Figs. 1, 2 and 3, A designates the body of a milk container of the conoidal type having fitted in its top open end the usual annular collar 1 having at its lower edge an annular flange 2 forming a discharge opening 3 adapted to be closed by the usual flat circular disc 4.

In this type of container, I provide a circular valve 5 fitted in the container A, and provided at one side of its edge with a flap or tab 6 fastened, as by glue to the inner wall of the container body A below and spaced at a substantial distance from the discharge opening 3, at about what would be the usual separating line between the cream and the milk, after the cream has risen.

The flap or tab 6 forms a hinged connection between the valve 5 and the body A on which the valve 5 can be swung from the open depending position, shown in solid lines in Fig. 1 to the transverse closed position shown in dotted lines in Fig. 1, and then upwardly to the upwardly extending open position, shown in Fig. 2.

For so swinging the valve 5, there is provided a strand, preferably flexible, such as a single thread, cord or fine wire 7 attached at one end to the valve 5 and at its other end to the detachable closure 4 in any suitable manner, as by being extended through said valve and closure with its ends fastened thereto respectively by a small disc 8 fastened, as by glue, to the under side of the valve 5, and to another small disc 9 fastened, as by glue, to the outer side of the closure 4.

In operation, the parts are positioned, as shown in solid lines in Fig. 1, after the milk has been placed in the container A.

After the cream has risen, and it is desired to separate it from the milk, the closure 4 is removed and the strand 7 is pulled upwardly to swing the valve 5 to the transverse closed position, shown in dotted lines in Fig. 1.

To releasably hold the valve 5 in the closed position, abutment means may be provided, such as a strip of thick paper 10 fastened, as by glue, or otherwise, to the inner wall of the body A diametrically opposite to the tab or flap 6, with its horizontal under edge in the path of the valve 5, so as to yieldingly hold the valve in the closed dotted position shown in dotted lines in Fig. 1. The valve 5 is of flexible paper, so that by harder pulling it may be drawn upwardly past the abutment strip 10 to the upwardly extending open position, shown in Fig. 2.

When the valve 5 is in the closed position, it will separate the milk from the cream, and the cream may be poured out through the discharge opening 3. When the valve is moved past the abutment strip 10, the milk may be poured out separately. If it is desired to pour out the cream and the milk together, the valve in the first instance is drawn from the depending position shown in solid lines in Fig. 1 to the upwardly extending open position shown in Fig. 2.

In Fig. 8 is shown a modified form of abutment means for yieldingly holding the valve 5 in the transverse closed position, in which form, the conoidal body A′ has formed in it an annular inwardly extending crease 11 against the under edge of which the valve 5 engages, when in the transverse closed position. As with the use of the abutment strip 10, by harder pulling, the valve 5 will bend so as to be drawn upwardly inside the crease 11 to the upwardly extending open position.

In other respects, the construction corresponds to that shown in Figs. 1, 2 and 3.

Referring to Figs. 4, 5, 6 and 7, B designates the body of a container of the rectangular shape. In this type of container, the upper end of the body B has at one side a discharge opening 3a adapted to be closed by a rectangular flap closure 4a, the upper end of which is fastened to the upper side of the body B above the discharge opening 3a.

The closure 4a is fastened in the closed position, shown in Fig. 4, by gluing its free end to the side of the body B below the discharge opening 3a. The flap closure 4a is of pliable paper, adapting it to be swung upwardly to the open position, shown in dotted lines in Fig. 4, and in solid lines in Fig. 5, and also permitting it to be bent near its lower edge to the side of the body B.

The valve construction shown in Figs. 4, 5 and 6 is similar to that shown in Figs. 1, 2 and 3, excepting that the form of the valve 5a is rectangular and of dimensions and shape, to adapt it to be closely fitted to the interior of the body B, when swung to the transverse closed position, shown in dotted lines in Fig. 4 and in solid lines in Fig. 6. An abutment strip of paper 10a is fastened, as in the form shown in Figs. 1, 2 and 3, to the inner side of the wall opposite that to which is fastened the flap or tab 6a, corresponding in structure and function to the tab or flap 6 of Fig. 1, excepting that it extends the full width of the rectangular valve 5a.

A flexible strand 7, corresponding to that shown in Fig. 1, is similarly fastened to the valve 5a and to the hinged closure flap 4a.

In operation, the container having been filled with milk, when the cream has risen, the flap closure 4a is released from the body B, excepting at its upper end portion, and then swung upwardly to the open position, shown in dotted lines in Fig. 4, so as to close the valve 5a against the lower edge of the abutment strip 10a.

After the cream has been poured out, the strand 7 is pulled to draw the valve 5a past the abutment strip 10a to the upwardly extending open position, shown in Fig. 5, after which the milk may be poured out through the discharge opening 3a. If desired, as with the form shown in Fig. 1, the valve 5a may be initially swung from the depending position, shown in Fig. 4 to the upwardly extending position, shown in Fig. 5, so the milk and cream may be poured out at the same time, when it is not desired to separate them.

Many modifications of my invention, other than the forms shown, may be made, within the scope of the appended claims, without departing from the spirit of my invention.

What I claim is:

1. In combination with a milk container of the kind described having a top end discharge opening and a closure for said opening, of a valve fitted in said container and hinged to an inner wall thereof below and spaced from said discharge opening so as to be swung upwardly from a depending open position to a transverse closed position, and then upwardly to an upwardly extending open position and means connecting said valve with said closure by which when said closure is moved to an open position said valve will be so swung.

2. In combination with a milk container of the kind described having a top end discharge opening, and a closure for said opening, of a valve fitted in said container and hinged to an inner wall thereof below and spaced from said discharge opening so as to be swung upwardly from a depending open position to a transverse closed position, and then upwardly to an upwardly extending open position and a strand attached to said valve and to said closure by which when said closure is moved to an open position said valve will be so swung.

3. In combination with a milk container of the kind described having a top end discharge opening, of a flexible valve fitted in said container and hinged to an inner wall thereof below and spaced from said discharge opening so as to be swung upwardly from a depending open position to a transverse closed position and then to an upwardly extending open position, abutment means for yieldingly holding said valve in said closed position, and means for so swinging said valve.

4. In combination with a milk container of the kind described having a top end discharge opening, of a flexible valve fitted in said container and hinged to an inner wall thereof below and spaced from said discharge opening so as to be swung upwardly from a depending open position to a transverse closed position and then to an upwardly extending open position, abutment means for yieldingly holding said valve in said closed position, and means including a strand attached to said valve for so swinging said valve.

5. In combination with a milk container of the kind described having a top end discharge opening and a closure for said opening, of a flexible valve fitted in said container and hinged to an inner wall thereof below and spaced from said discharge opening so as to be swung upwardly from a depending open position to a transverse closed position and then upwardly to an upwardly extending open position, abutment means for yieldingly holding said valve in said closed position, and a strand attached to said valve and to said closure by which said valve will be so swung when said closure is moved to an open position.

VERNON E. STEEN.